United States Patent
Kim et al.

(10) Patent No.: US 11,966,221 B2
(45) Date of Patent: *Apr. 23, 2024

(54) METHOD FOR HANDLING GOODS BY COLLABORATION OF AUTONOMOUS OBJECTS

(71) Applicants: PABLO AIR Co., Ltd., Incheon (KR); PABLO AIR International, INC., Phoenix, AZ (US)

(72) Inventors: Youngjoon Kim, Incheon (KR); Seung Han Lim, Daejeon (KR)

(73) Assignees: PABLO AIR Co., Ltd., Incheon (KR); PABLO AIR International, INC., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,391

(22) Filed: Jul. 13, 2022

(65) Prior Publication Data
US 2022/0357739 A1    Nov. 10, 2022

Related U.S. Application Data

(63) Continuation of application No. 17/519,015, filed on Nov. 4, 2021, now Pat. No. 11,415,981.

(30) Foreign Application Priority Data

Mar. 4, 2021 (KR) .................. 10-2021-0028671

(51) Int. Cl.
*G05D 1/00* (2006.01)
*B60P 1/02* (2006.01)
(Continued)

(52) U.S. Cl.
CPC .............. *G05D 1/0027* (2013.01); *B60P 1/02* (2013.01); *B64C 39/024* (2013.01);
(Continued)

(58) Field of Classification Search
CPC ....... G05D 1/0027; G05D 1/0287; B60P 1/02; B64C 39/024
(Continued)

(56) References Cited

U.S. PATENT DOCUMENTS 10,933,994 B2    3/2021 Rivaya
11,392,130 B1 *  7/2022 Desrosiers ............. G01C 21/20
(Continued)

FOREIGN PATENT DOCUMENTS

KR       10-1151449 B1    6/2012
KR    10-2017-0074369 A   6/2017
(Continued)

*Primary Examiner* — Peter D Nolan
*Assistant Examiner* — Luke Huynh
(74) *Attorney, Agent, or Firm* — Studebaker & Brackett PC

(57) ABSTRACT

Provided is a method for delivering goods in collaboration of a plurality of autonomous vehicles including a master vehicle and one or more slave vehicles. The method comprises calculating, by the master vehicle among the plurality of autonomous vehicles, a floor area required for unloading the goods based on a size of the goods, searching and determining, by the master vehicle, a region providing a flat area greater than or equal to the floor area as a goods handing over point, providing, by the master vehicle, position information of the goods handing over point to the one or more slave vehicles so that the one or more slave vehicles are gathered to the goods handing over point, providing, by the master vehicle, the position information of the goods handing over point to an unmanned aerial vehicle so that the unmanned aerial vehicle moves to the goods handing over point, determining, by the master vehicle, a portion of the goods to be supported by each autonomous vehicle based on a size of delivery target goods, moving, by each autonomous vehicle located at the goods handing over point, to a position corresponding to the determined portion, taking over the (Continued)

goods from the unmanned aerial vehicle and loading them together by collaborating with each autonomous vehicle at the moved position, and delivering the loaded goods to a destination by the plurality of autonomous vehicles.

9 Claims, 12 Drawing Sheets

(51) Int. Cl.
*B64C 39/02* (2023.01)
*B64U 101/60* (2023.01)

(52) U.S. Cl.
CPC ....... *G05D 1/0287* (2013.01); *B64U 2101/60* (2023.01); *B64U 2201/10* (2023.01); *B64U 2201/20* (2023.01)

(58) Field of Classification Search
USPC .......................................................... 701/23
See application file for complete search history.

(56) References Cited

U.S. PATENT DOCUMENTS

| | | | |
|---|---|---|---|
| 2015/0370251 A1* | 12/2015 | Siegel | G05D 1/0684 701/2 |
| 2016/0200438 A1* | 7/2016 | Bokeno | G05D 1/102 244/2 |
| 2019/0025818 A1 | 1/2019 | Mattingly et al. | |

FOREIGN PATENT DOCUMENTS

| | | |
|---|---|---|
| KR | 10-2018-0031114 A | 3/2018 |
| KR | 10-2018-0083569 A | 7/2018 |
| KR | 10-1885371 B1 | 8/2018 |
| KR | 10-2019-0008709 A | 1/2019 |
| KR | 10-2019-0117421 A | 10/2019 |
| KR | 10-2020-0013135 A | 2/2020 |
| KR | 10-2020-0050572 A | 5/2020 |

* cited by examiner

METHOD FOR HANDLING GOODS BY COLLABORATION OF AUTONOMOUS OBJECTS

CROSS-REFERENCE TO RELATED APPLICATIONS

This application is a Continuation Application of U.S. patent application Ser. No. 17/519,015, filed on Nov. 4, 2021, which claims the benefit of Korean Patent Application No. 10-2021-0028671, filed on Mar. 4, 2021, in the Korean Intellectual Property Office, the disclosure of which is incorporated herein by reference in its entirety.

BACKGROUND

1. Field

The present disclosure relates to a method and apparatus for delivering goods through collaboration of an autonomous driving mobile object. More particularly, it relates to a method and apparatus for delivering goods took over from an unmanned aerial vehicle for delivery to a delivery destination in collaboration with a plurality of autonomous driving mobile objects such as an autonomous driving robot and an autonomous vehicle.

2. Description of the Related Art

Today, unmanned aerial vehicles such as drones are being used in various fields. For example, unmanned aerial vehicles are being used in the broadcasting field, agriculture field, military field, and the like. Furthermore, technology for delivering goods using unmanned aerial vehicles is also currently being developed. For example, research is being conducted on a service, in which an unmanned aerial vehicle loads and delivers goods to a designated place. Using such an unmanned aerial vehicle for delivery not only saves labor costs, but also enables rapid delivery of goods to areas where vehicles are difficult to move, such as mountainous areas and islands.

In addition, research, in which a ground robot takes over the goods from the unmanned aerial vehicle and delivers the goods to a designated delivery destination, is also being conducted. That is, research for an unmanned delivery system, in which an unmanned aerial vehicle unloads goods with a ground robot, and the ground robot delivers the unloaded goods to a designated delivery destination, thereby not requiring any manpower, is actively conducting.

However, the existing unmanned delivery system does not consider the delivery of heavy or bulky goods. That is, the existing unmanned delivery system only considers delivery of light-weighted goods, and does not consider delivery of goods having a weight exceeding the loading capacity of the ground robot.

SUMMARY

A technical problem to be solved by the present disclosure is to provide a goods delivery method and apparatus capable of loading heavy goods and delivering them to a destination through collaboration with a plurality of autonomous vehicles.

Another technical problem to be solved by the present disclosure is to provide a goods delivery method and apparatus, in which a plurality of autonomous vehicles stably load goods at a position of a goods portion that they in charge of and deliver them.

Another technical problem to be solved by the present disclosure is to provide a goods delivery method and apparatus for maintaining an equilibrium state of goods despite a difference in road gradient or ground elevation.

The technical problems of the present disclosure are not limited to the technical problems mentioned above, and other technical problems not mentioned will be clearly understood by those skilled in the art from the following description.

According to an embodiment, a method for delivering goods in collaboration of a plurality of autonomous vehicles including a master vehicle and one or more slave vehicles may include calculating by the master vehicle among the plurality of autonomous vehicles, a floor area required for unloading the goods based on a size of the goods, searching and determining, by the master vehicle, a region providing a flat area greater than or equal to the floor area as a goods handing over point, providing, by the master vehicle, position information of the goods handing over point to the one or more slave vehicles so that the one or more slave vehicles are gathered to the goods handing over point, providing, by the master vehicle, the position information of the goods handing over point to an unmanned aerial vehicle so that the unmanned aerial vehicle moves to the goods handing over point, determining, by the master vehicle, a portion of the goods to be supported by each autonomous vehicle based on a size of delivery target goods, moving, by each autonomous vehicle located at the goods handing over point, to a position corresponding to the determined portion, taking over the goods from the unmanned aerial vehicle and loading them together by collaborating with each autonomous vehicle at the moved position, and delivering the loaded goods to a destination by the plurality of autonomous vehicles.

According to an embodiment, wherein moving, by each autonomous vehicle, to a position corresponding to the determined portion may include moving, by the slave vehicle, based on the position information on the goods handing over point, wherein taking over the goods and loading them together may include taking over the goods from the unmanned aerial vehicle at a position corresponding to the determined portion by each of the slave vehicle and the master vehicle.

According to an embodiment, wherein determining the portion of the goods to be supported may include determining, by the master vehicle, a portion of the goods to be supported by each of the master vehicle and the slave vehicle based on a size of the goods, and providing, by the master vehicle, position information on the portion of the goods to be supported by the slave vehicle to the slave vehicle.

According to an embodiment, wherein the plurality of autonomous vehicles may include a lifter capable of raising and lowering, wherein delivering the loaded goods may include loading the goods onto the lifter and raising them by each autonomous vehicle.

According to an embodiment, wherein delivering the loaded goods may include, determining a difference in elevation of a ground, on which each of the autonomous vehicles is located, while the plurality of autonomous vehicles are moving, and raising the lifter by an autonomous vehicle located on a relatively low ground to maintain equilibrium of the goods, or lowering the lifter by an autonomous vehicle located on a relatively high ground to maintain equilibrium of the goods.

According to another embodiment, an autonomous vehicle may include, a driving unit for moving the autonomous vehicle; a goods loading unit, in which goods took over from an unmanned aerial vehicle are seated, and a control unit, wherein the control unit, calculates a floor area required for unloading the goods based on a size of the goods, searches and determines a region providing a flat area greater than or equal to the floor area as a goods handing over point, controls to provide position information of the goods handing over point to one or more other autonomous vehicles so that the one or more other autonomous vehicles are gathered to the goods handing over point, controls to provide the position information of the goods handing over point to the unmanned aerial vehicle so that the unmanned aerial vehicle moves to the goods handing over point, determines a portion of the goods to be supported by the one or more other autonomous vehicles and the autonomous vehicle based on a size of the goods, controls to provide information on the determined portion to the one or more other autonomous vehicles so that the other autonomous vehicle located at the goods handing over point moves to a position corresponding to the determined portion, controls the driving unit to move the autonomous vehicle to a portion of the goods to be supported by the autonomous vehicle, and then controls the autonomous vehicle to collaborate with the one or more other autonomous vehicles at the moved position to take over the goods from the unmanned aerial vehicle to load them in the goods loading unit, and controls the autonomous vehicle to collaborate with the one or more other autonomous vehicles to deliver the loaded goods to a destination.

DETAILED DESCRIPTION

Hereinafter, embodiments of the present disclosure will be described with reference to the attached drawings. Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

The terms "autonomous driving mobile object" and "autonomous vehicle" are used interchangeably throughout this specification and the drawings. In addition, the terms "master mobile object" and "master vehicle" and the terms "slave mobile object" and "slave vehicle" are used interchangeably.

Hereinafter, some embodiments of the present disclosure will be described in detail with reference to the accompanying drawings.

Figure 1:
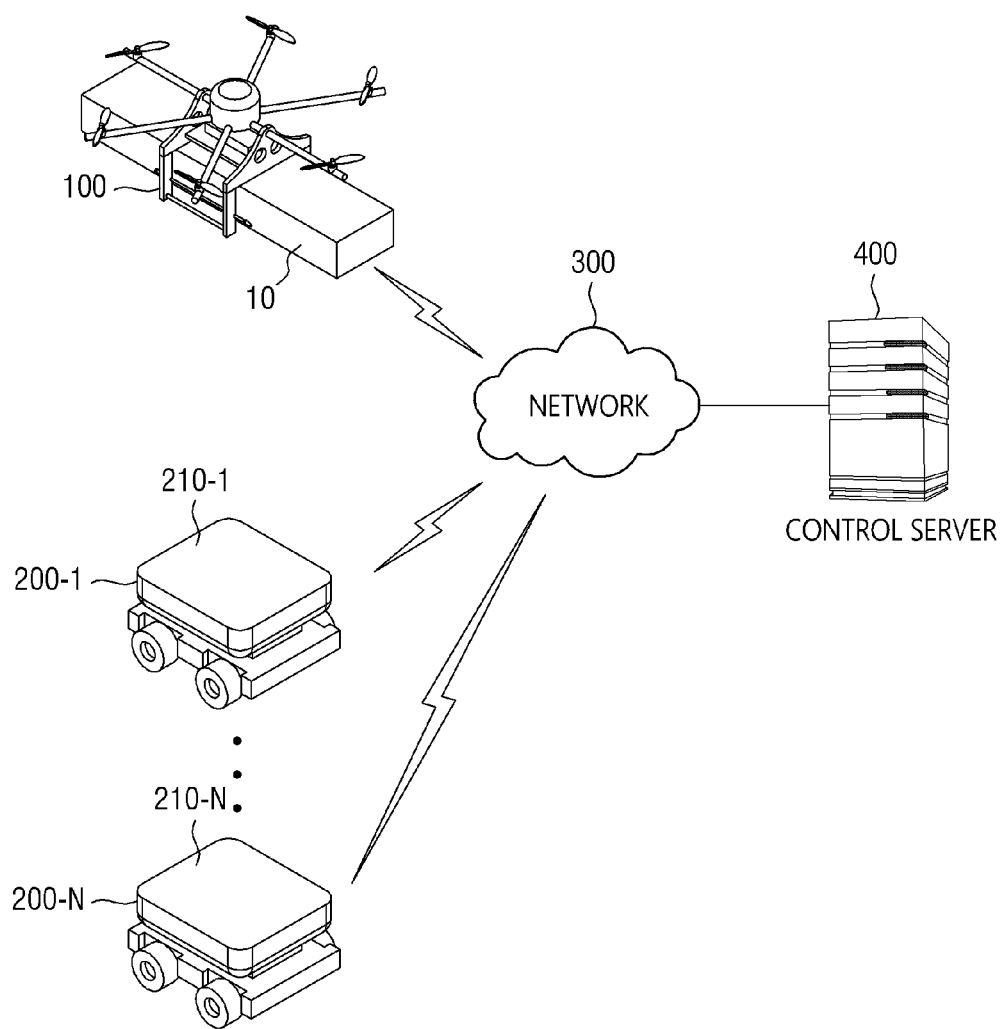
FIG. 1 is a diagram showing the configuration of a delivery system according to an embodiment of the present disclosure.

FIG. 1 is a diagram showing the configuration of a delivery system according to an embodiment of the present disclosure.

As shown in FIG. 1, the delivery system according to an embodiment of the present disclosure may include an unmanned aerial vehicle 100, a plurality of autonomous driving mobile objects, or autonomous vehicles, 200-N, and a control server 400, and each of these components may communicate with each other via the network 300. The network 300 includes a mobile communication network and a wired communication network, and may support communication between the unmanned aerial vehicle 100 or the autonomous vehicle 200-N and the control server 400.

The control server 400 is a server that controls the unmanned aerial vehicle 100 and the autonomous vehicle 200-N, and may provide delivery information including an unloading place, delivery destination information, weight of the goods 10, volume and shape of the goods 10, etc. to the unmanned aerial vehicle 100. Also, the control server 400 may provide the delivery information to the autonomous vehicle 200-N. The control server 400 may receive the position information from the unmanned aerial vehicle 100 or the autonomous vehicle 200-N, and monitor whether the unmanned aerial vehicle 100 or the autonomous driving mobile vehicle 200-N is moving to a designated position. In addition, the control server 400 may designate a plurality of autonomous vehicles 200-N for unloading goods of the unmanned aerial vehicle 100. That is, the control server 400 may select a plurality of autonomous vehicles 200-N for taking over the goods 10 of the unmanned aerial vehicle 100 from among multiple autonomous vehicles, and provide the delivery information to the selected plurality of autonomous vehicles 200-N.

The unmanned aerial vehicle 100 is a flying device that delivers the goods 10 to a designated unloading place, has one or more thrust generating means such as a propeller, and can fly in the air using the thrust generating means. The unmanned aerial vehicle 100 may autonomously fly to an unloading place, and may land or fly in place when arriving at the unloading place. In some embodiments, the unmanned aerial vehicle 100 may receive position information of a goods handing over point from a master mobile object, or a master vehicle, among autonomous vehicles, and move to the goods handing over point based on the position information. Here, the unloading place may be position information, at which the goods are unloaded on the ground or the platform, and the goods handing over point may be a position where the goods are handed over to the plurality of autonomous vehicles 200-N. The unloading place may be determined by the control server 400, and the goods handing over point may be determined by the master vehicle as described below.

Figure 2:
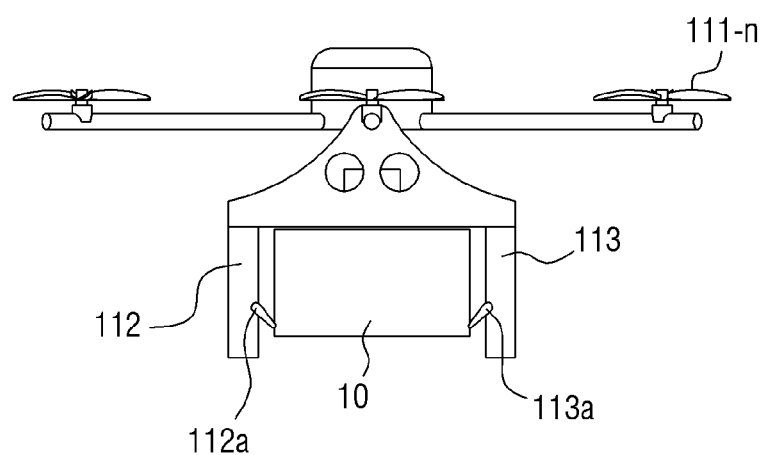
FIG. 2 is a front view of an unmanned aerial vehicle referenced in some embodiments of the present disclosure.
Figure 3:
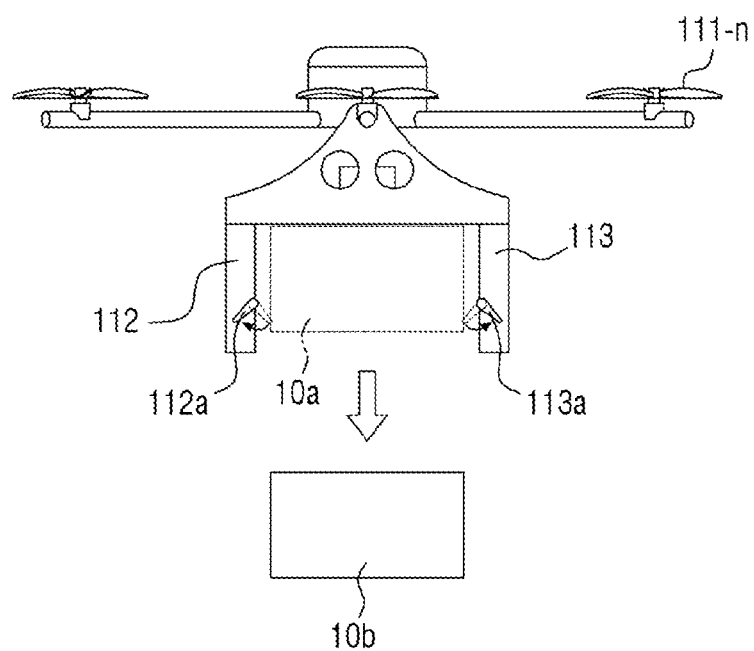
FIG. 3 is a view illustrating a state, in which the unmanned aerial vehicle of FIG. 2 releases the gripping of the goods.

As the autonomous flight method of the unmanned aerial vehicle 100, a known technology may be used. The unmanned aerial vehicle 100 is provided with gripping members 112 and 113 capable of gripping the goods 10 as shown in FIGS. 2 and 3, and may operate to the unloading place or the goods handing over point while gripping the goods 10 using the gripping members 112 and 113. In the present embodiment, the gripping members 112 and 113 may also serve as a landing gear when landing. When the unmanned aerial vehicle 100 moves to a goods handing over point, the goods 10 may be unloaded into the plurality of goods loading units 210-N in the air. At this time, when the unmanned aerial vehicle 100 receives the unloading request signal from the autonomous vehicle 200-N, it may release the gripping state of the goods 10 to unload the goods 10 into the plurality of goods loading units 210-N. In another embodiment, the unmanned aerial vehicle 100 may unload the goods 10 at an unloading place. The unloading place may be a ground or a landing platform.

The autonomous vehicle 200-N is a device that delivers the goods 10 to a designated destination using a driving means such as wheels and legs, and may include an autonomous driving vehicle, an autonomous driving robot, and the like. The autonomous vehicle 200-N includes a goods loading unit 210-N, in which the goods 10 is unloaded. The autonomous vehicle 200-N may perform short-range wireless communication with the unmanned aerial vehicle 100.

According to this embodiment, after recognizing the goods 10 or the unmanned aerial vehicle 100, the autonomous vehicle 200-N may autonomously drive to the position of the goods 10 in order to take over the goods 10. In an embodiment, the number of autonomous vehicles 200-N for loading the goods 10 is determined based on one or more of the size, shape, and volume of the goods 10, and the autonomous vehicles 200-N corresponding to the determined number may move to the position of the goods 10. In addition, the portion of the goods to be supported by each autonomous vehicle 200-N is determined, and each autonomous vehicle 200-N may move to a portion that they in charge of, and then a plurality of autonomous vehicles 200-N at the corresponding position may collaborate with each other to load the goods 10 together. In addition, the plurality of autonomous vehicles 200-N may move to a delivery destination together at a uniform speed to deliver the loaded goods 10 to a delivery destination.

According to the present embodiment, a plurality of autonomous vehicles 200-N collaborate to load and deliver the heavy goods 10, so that an effect of enabling to deliver even the heavy goods 10 can be yielded.

Hereinafter, the configuration and operation of the unmanned aerial vehicle 100 applied to some embodiments of the present disclosure will be described with reference to FIGS. 2 and 3.

FIG. 2 is a front view of an unmanned aerial vehicle referenced in some embodiments of the present disclosure.

FIG. 3 is a view illustrating a state, in which the unmanned aerial vehicle of FIG. 2 releases the gripping of the goods.

Referring to FIGS. 2 and 3, the unmanned aerial vehicle 100 referenced in some embodiments of the present disclosure includes a plurality of propellers 111-$n$ as means for generating thrust, and a gripping member 112, 113 for gripping the goods.

The plurality of propellers 111-$n$ are rotated according to the control to levitate the unmanned aerial vehicle 100 in the air.

The gripping members 112, 113 grip the goods 10. As shown in FIGS. 2 to 3, the gripping members 112 and 113 are symmetrically formed on both sides, and an internal space capable of accommodating the goods 10 may be provided therein. In addition, the gripping members 112 and 113 may include pressing members 112$a$ and 113$a$ for gripping the goods 10 by pressing the goods 10 with a constant force on the inner surface thereof. The pressing members 112$a$ and 113$a$ may have a predetermined length.

The pressing members 112$a$ and 113$a$ press the goods 10 toward the inner surface when gripping the goods, and when releasing the gripping of goods and unloading them, they move to the outer surface to release the pressing force applied in the direction of the goods 10. As illustrated in FIG. 3, when the pressing members 112$a$ and 113$a$ move to the outer surface, the gripping state of the goods 10$a$ is released, so that the goods 10$b$ falls downward.

Figure 4:
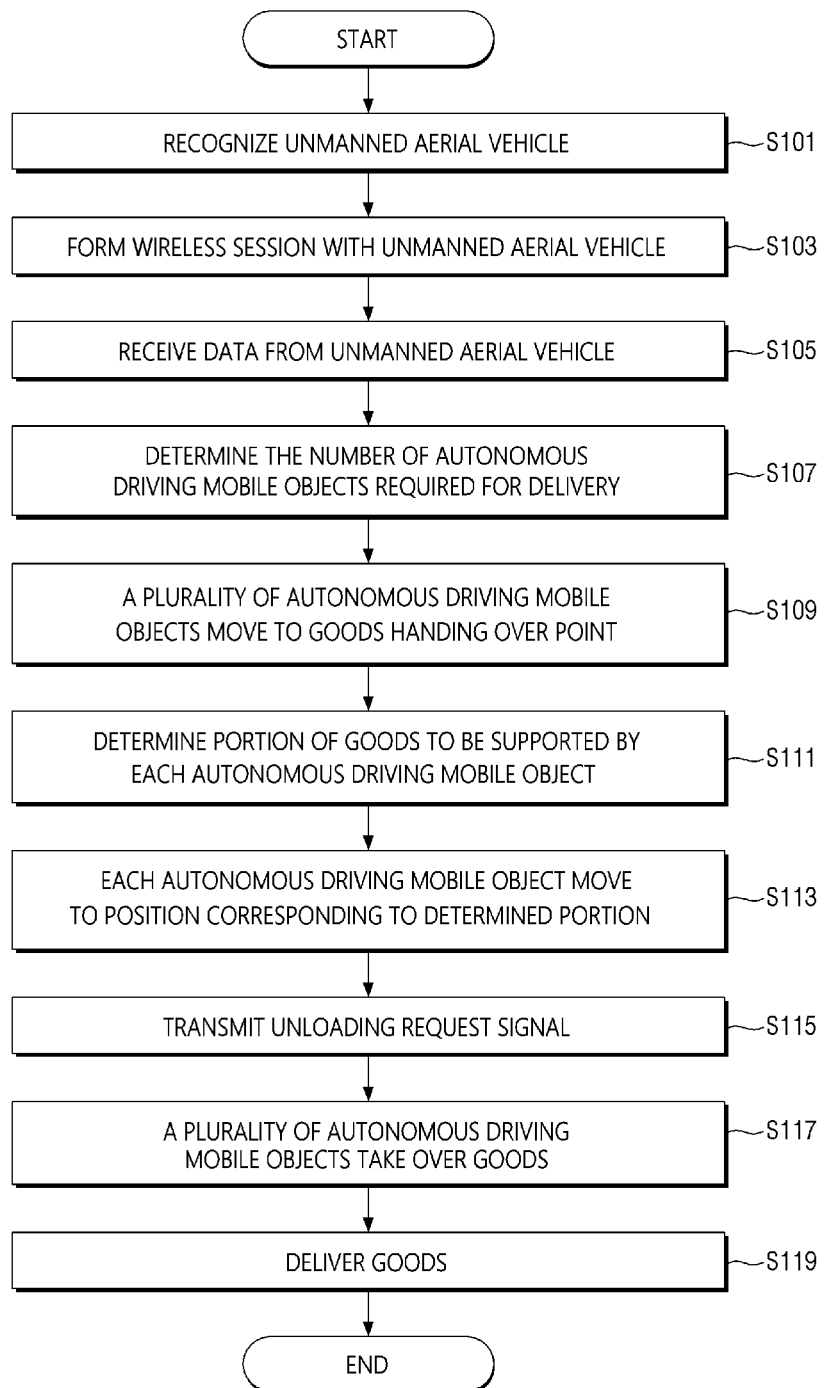
FIG. 4 is a flowchart illustrating a method of delivering goods in collaboration with a plurality of autonomous vehicles according to another embodiment of the present disclosure.

FIG. 4 is a flowchart illustrating a method of delivering goods in collaboration with a plurality of autonomous vehicles according to another embodiment of the present disclosure.

Referring to FIG. 4, one or more autonomous vehicles 200-N may recognize the unmanned aerial vehicle 100 for taking over the goods 10 (S101). In one embodiment, the autonomous vehicle 200-N receives and stores identification information of the unmanned aerial vehicle 100 for unloading goods from the control server 400 in advance, and may determine that the unmanned aerial vehicle 100 for taking over the goods 10 is recognized when the identification information detected through short-range wireless communication matches the identification information of the unmanned aerial vehicle 100 that is being stored. As another embodiment, the autonomous vehicle 200-N may photograph the surroundings using a camera, and analyze the photographed image to recognize the unmanned aerial vehicle 100 existing in the vicinity.

Subsequently, the autonomous vehicle 200-N may form a short-range wireless session with the recognized unmanned aerial vehicle 100 (S103). Next, the autonomous vehicle 200-N may receive various data required for goods delivery and unloading from the unmanned aerial vehicle 100, with which a short-range wireless session is formed (S105). For example, the autonomous vehicle 200-N may receive delivery information including delivery destination information, unloading place information, and the size, weight, shape, etc. of the goods 10 from the unmanned aerial vehicle 100, and may also receive one or more of position data (e.g., GNSS coordinates), altitude data, and posture data of the unmanned aerial vehicle 100 from the unmanned aerial vehicle 100. The posture data may include yaw, roll, and pitch of the unmanned aerial vehicle 100.

Based on at least one of the size, weight, and shape of the goods 10, the number of autonomous vehicles 200-N that load and deliver the goods 10 may be determined (S107). In an embodiment, an autonomous vehicle, set as a master (hereinafter referred to as a 'master mobile object' or a 'master vehicle') among the plurality of autonomous vehicles 200-N may determine the number of autonomous vehicles 200-N based on at least one of the size, weight, and shape of the goods 10. The master vehicle may be selected by the control server 400, or the autonomous vehicle 200-N that first recognizes the unmanned aerial vehicle 100 among the plurality of autonomous vehicles 200-N may be selected as the master vehicle. Among the plurality of autonomous vehicles 200-N, autonomous vehicles excluding the master vehicle are set as slaves. As another embodiment, the control server 400 may determine the number of autonomous vehicles 200-N based on at least one of the size, weight, and shape of the goods 10. The allowable loading amount and loading size of each autonomous vehicle 200-N are predefined. The loading amount/loading size of each autonomous vehicle 200-N is compared with the weight/size of the goods 10, and the number of autonomous vehicles 200-N for loading and delivering the goods 10 may be determined.

A plurality of autonomous vehicles 200-N corresponding to the number determined by the master vehicle or the control server 400 may be selected. Next, the selected plurality of autonomous vehicles 200-N may be moved to an unloading place or a goods handing over point (S109). Here, the goods handing over point may indicate a position, at which the plurality of autonomous vehicles 200-N take over the goods from the unmanned aerial vehicle 100. In addition, the unloading place may indicate a position of the ground or platform, on which the goods are seated. As will be described later with reference to FIG. 6, the master vehicle may search for a goods handing over point and provide it to each of the autonomous vehicle set as a slave (hereinafter referred to as a 'slave mobile object' or a 'slave vehicle') and the unmanned aerial vehicle 100.

Next, a portion of the goods 10 to be supported by each of the selected autonomous vehicles 200-N may be determined (S111). In an embodiment, the master vehicle may image recognize a goods through a camera, and analyze the image of the image recognized goods to determine a portion of the goods 10 to be supported by each autonomous vehicle 200-N. As another embodiment, based on the size of the goods 10 included in the delivery information received from the control server 400 or the unmanned aerial vehicle 100, the master vehicle may determine a portion of the goods 10 to be supported by each autonomous vehicle 200-N. As another embodiment, the control server 400 may determine the portion of the goods 10 to be supported by each autonomous vehicle 200-N based on the size of the goods 10, and transmit it to each autonomous vehicle 200-N. The supported portion of the goods 10 may include a corner portion of the lower surface of the goods 10. In one embodiment, the control server 400 or the master vehicle may first determine the supported portion so that the portion including the corner of the lower surface of the goods 10 can be supported first, and determine the supported portion located between the corners based on the number of the autonomous vehicles 200-N.

Next, the plurality of autonomous vehicles 200-N selected for goods delivery may move to positions corresponding to the determined portions (S113). That is, each autonomous vehicle 200-N may move to an unloading place or a goods handing over point, and then move to a position corresponding to the determined portion. Here, the position corresponding to the portion of the goods 10 may be a position immediately under the portion of the goods 10. In one embodiment, the master vehicle may move to the unloading place, measure a position (e.g., GNSS coordinates) corresponding to each of the determined supported portions in advance, and provide position information on the goods portion to be supported by the slave vehicle to the slave vehicle. The master vehicle may photograph an image of the goods 10 using a camera, analyze the photographed image to recognize the portion of the goods to be supported by each autonomous vehicle 200-N, and then measure the position information of each goods portion by moving under the corresponding portion. The slave vehicle may move based on the received position information, and may be arranged at a position corresponding to the goods portion to be supported by the slave vehicle. In addition, the master vehicle may move to a position corresponding to the goods portion to be supported by the master vehicle and be arranged.

When the plurality of autonomous vehicles 200-N are arranged at positions for unloading goods, an unloading request signal may be transmitted to the unmanned aerial vehicle 100 (S115). In an embodiment, when the arrangement of the plurality of autonomous vehicles 200-N is completed, the master vehicle may transmit the unloading request signal to the unmanned aerial vehicle 100 through short-range wireless communication.

Figure 5:
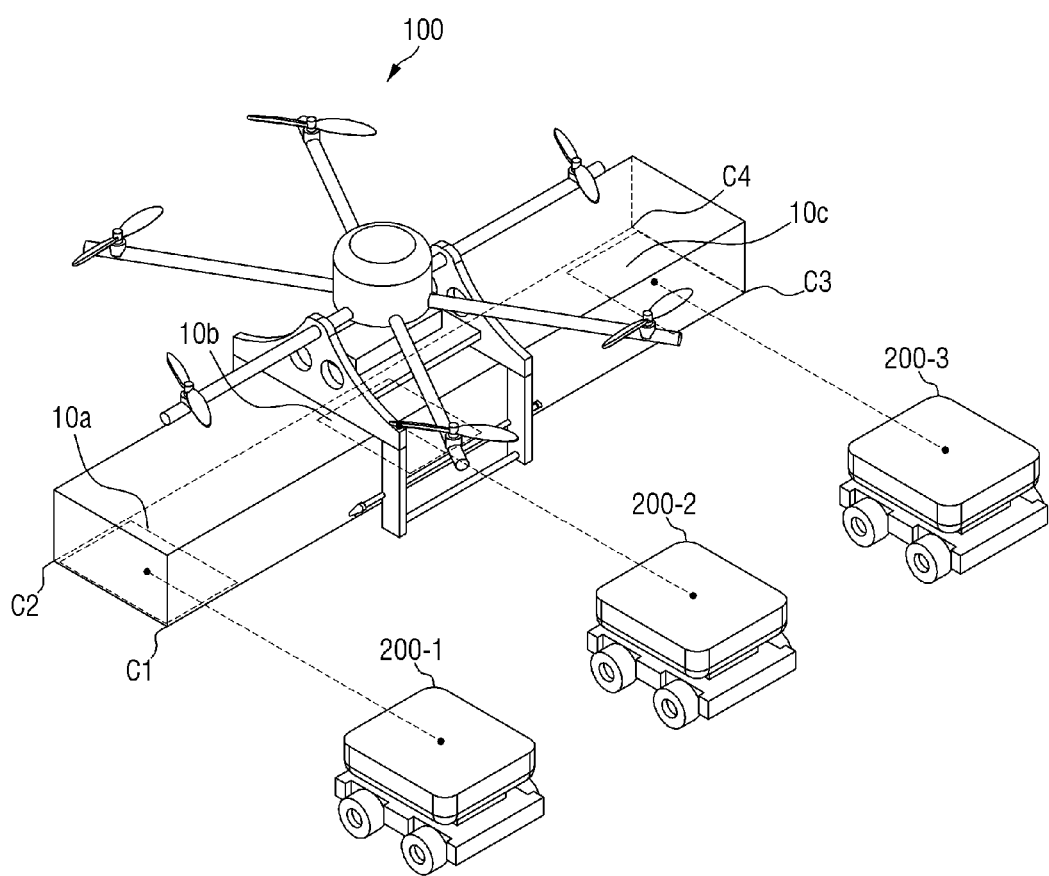
FIG. 5 is a diagram illustrating a plurality of autonomous vehicles moving toward a designated position to take over goods.

FIG. 5 is a diagram illustrating a plurality of autonomous vehicles moving toward a designated position to take over goods.

As illustrated in FIG. 5, a plurality of autonomous vehicles 200-1, 200-2, and 200-3 may move to positions corresponding to the designated portions 10*a*, 10*b*, 10*c* of the goods 10 and be arranged to take over the goods 10 through collaboration. The goods portion may include a corner of goods 10. That is, the corners C1, C2, C3, and C4 of the goods 10 on the entire surface of the goods may be supported by the autonomous vehicles 200-1 and 200-3, and accordingly, one or more autonomous vehicles 200-1 and 200-3 may be moved to positions corresponding to each corner C1, C2, C3, and C4 and arranged. In FIG. 5, it is illustrated that the first autonomous vehicle 200-1 is moved and arranged at a position capable of supporting the first portion 10*a* including the first corner C1 and the second corner C2, and the third autonomous vehicle 200-3 is moved and arranged at a position capable of supporting the third portion 10*c* including the third corner C3 and the fourth corner C4. In addition, in FIG. 5, the second autonomous vehicle 200-2 is located between the first autonomous vehicle 200-1 and the third autonomous vehicle 200-3. An arrangement interval of each of the autonomous vehicles 200-1, 200-2, and 200-3 may be constant. That is, the distance between the first autonomous vehicle 200-1 and the second autonomous vehicle 200-2 and the distance between the second autonomous vehicle 200-2 and the third autonomous vehicle 200-3 may be the same. As shown in FIG. 5, when a plurality of autonomous vehicles 200-1, 200-2, and 200-3 are arranged under the goods 10, the load of the goods 10 is dispersed to the plurality of autonomous vehicles 200-N.

On the other hand, when the size of the goods 10 is larger, four autonomous vehicles 200-N are selected to support different corners, and each autonomous vehicle 200-N selected in this way may be arranged at a position corresponding to a different corner. In addition, one or more other autonomous vehicles 200-N may be arranged between the autonomous vehicles 200-N in charge of each corner. The arrangement interval and the number of the autonomous vehicles 200-N may be determined based on one or more of the size, weight, and shape of the goods 10.

Referring back to FIG. 4, the unmanned aerial vehicle 100 receiving the unloading request signal may release the gripping state of the goods 10 and drop the goods 10 in the air. In this case, the plurality of autonomous vehicles 200-N may take over and load the goods 10 from the unmanned aerial vehicle 100 through the goods loading unit 210-N formed on the upper surface (S117).

The plurality of autonomous vehicles 200-N that have taken over the goods may check the delivery destination information in the delivery information, and deliver the goods 10 to a destination (i.e., delivery destination) based on the delivery destination information (S119). In this case, the plurality of autonomous vehicles 200-N may autonomously drive at a uniform speed and move to a destination.

According to the present embodiment, it is possible to safely take over and load heavy goods by using the plurality of autonomous vehicles 200-N.

Figure 6:
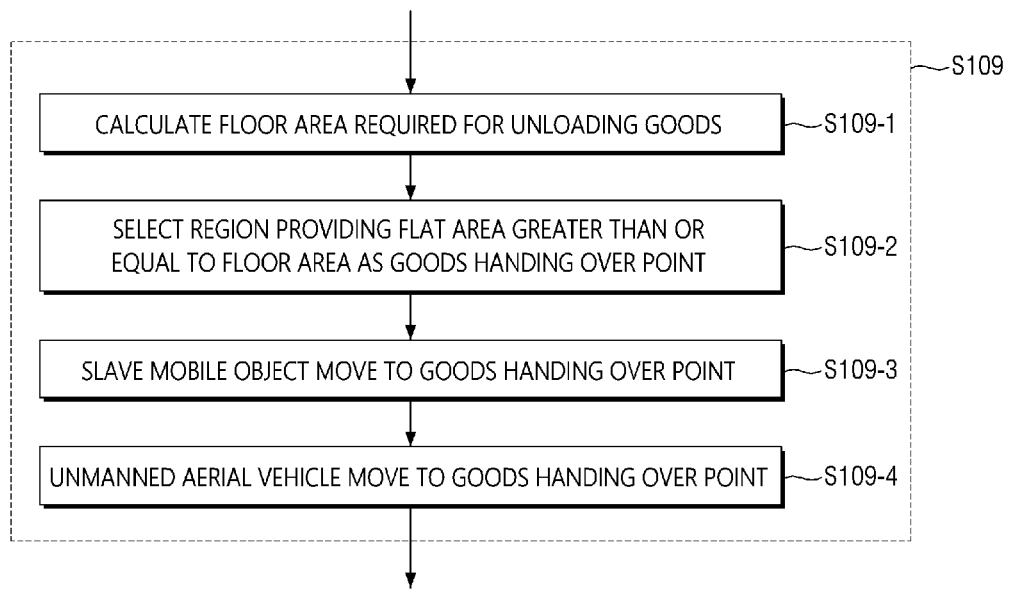
FIG. 6 is a flowchart for describing in more detail some operations of the goods delivery method that may be understood with reference to FIG. 4.

With reference to FIG. 6, a method of moving to a goods handing over point (S109) will be described in detail.

The master vehicle may calculate a floor area required for unloading the goods based on the size of the goods (S109-1). Next, the master vehicle may search the surrounding space to determine a region providing a flat area greater than or equal to the floor area as a goods handing over point (S109-2). In one embodiment, the master vehicle and the unmanned aerial vehicle 100 may share position information promised in advance, and after the master vehicle moves to the promised position, it may search a region providing a flat area greater than or equal to the floor area at the moved place. After measuring a peripheral gradient using a camera, the master vehicle may determine a region providing a flat area greater than or equal to the floor area as a goods handing over point. In another embodiment, the master vehicle may store 3D map data and determine a goods handing over point by searching for a region providing a flat area greater than or equal to the floor area by using topographic gradient data included in the 3D map data.

After the master vehicle locates at the searched goods handing over point, it may transmit the position information of the searched goods handing over point to the slave vehicle, and the slave vehicle may move to the goods handing over point based on the received position information. (S109-3).

The master vehicle may transmit the position information of the searched goods handing over point to the unmanned aerial vehicle 100, and the unmanned aerial vehicle 100 may move to the searched goods handing over point based on the received position information (S109-4).

According to this embodiment, an unloadable goods handing over point is searched, and the goods 10 can be safely and reliably taken over from the unmanned aerial vehicle 100.

Figure 7:
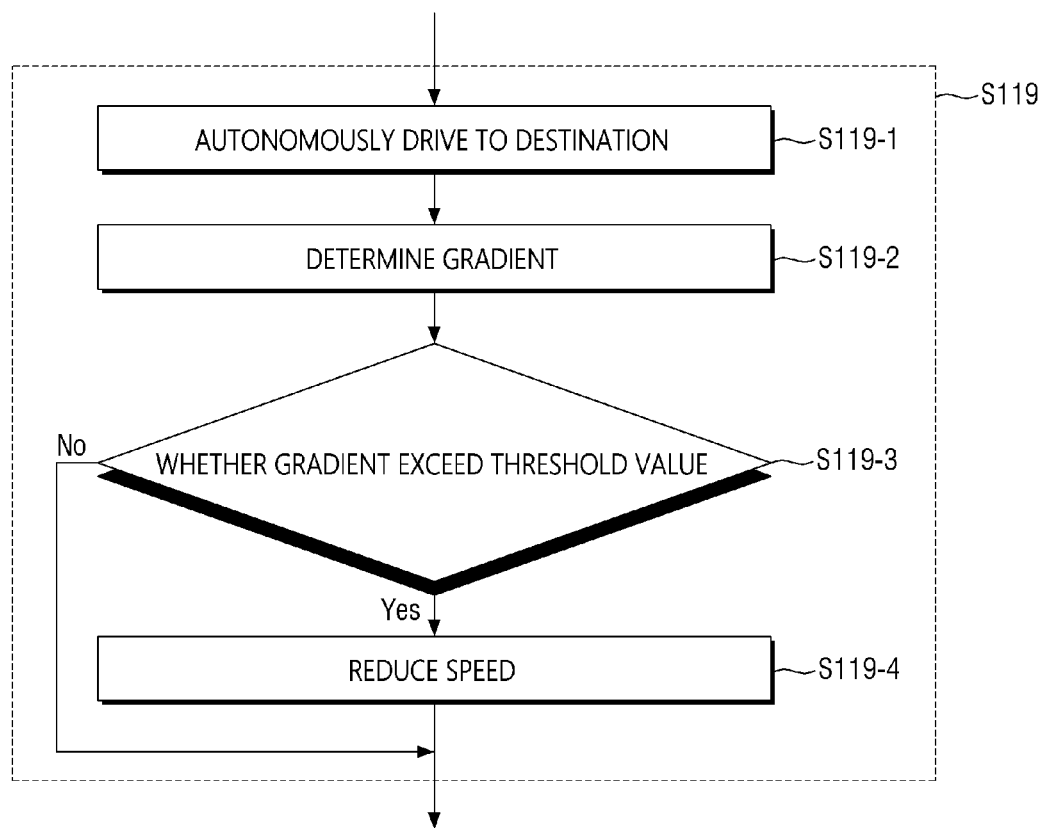
FIG. 7 is a flowchart for describing in more detail some operations of the goods delivery method that may be understood with reference to FIG. 4.

Referring to FIG. 7, a method of delivering goods to a destination (S119) will be described in detail.

A plurality of autonomous vehicles 200-N that take over and load the goods 10 may generate a delivery route from the current position to the destination, and autonomously drive to the destination based on the delivery route (S119-1). In this case, the plurality of autonomous vehicles 200-N may autonomously drive uniformly at a preset speed.

One or more autonomous vehicles among the plurality of autonomous vehicles 200-N may determine a gradient on the delivery route (S119-2). In an embodiment, an autonomous vehicle arranged at the forefront among the plurality of autonomous vehicles 200-N may determine the gradient. In this case, the autonomous vehicle arranged at the forefront may determine the gradient by using the topographic gradient data included in the 3D map data, or may determine the gradient based on sensing data acquired through a gradient sensor or a gradient value acquired through image analysis. The autonomous vehicle arranged at the forefront may determine the gradient from the current position to a point corresponding to a predetermined distance.

Next, it is determined whether the determined gradient exceeds a preset threshold value, and when it exceeds, it may be controlled so that the speed of the plurality of autonomous vehicles 200-N is reduced (S119-3 and S119-4). In one embodiment, when the determined gradient exceeds the threshold value, the autonomous vehicle arranged at the forefront may reduce its speed by a predetermined value, and transmit a message requesting a speed reduction to the remaining autonomous vehicles among the plurality of autonomous vehicles. In this case, the autonomous vehicle arranged at the forefront may transmit a message requesting a speed reduction to the remaining autonomous vehicles using short-range wireless communication. The autonomous vehicle 200-N receiving the message reduces the speed by the predetermined value.

According to the present embodiment, it is possible to reduce the speed of autonomous vehicles when driving on a gradient road, thereby preventing a situation, in which goods fall from the goods loading unit 210-N on a gradient road.

Hereinafter, an autonomous vehicle and a goods delivery method according to another embodiment of the present disclosure will be described with reference to FIGS. 8 to 12.

Figure 8:
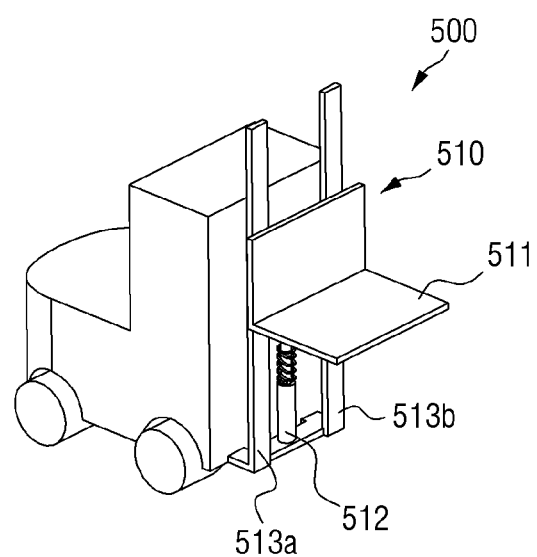
FIG. 8 is a perspective view of an autonomous vehicle according to another embodiment of the present disclosure.

FIG. 8 is a perspective view of an autonomous vehicle according to another embodiment of the present disclosure.

As shown in FIG. 8, the autonomous vehicle 500 according to another embodiment of the present disclosure may include a goods loading unit 510 capable of raising and lowering.

The goods loading unit 510 may include a lifter 511 capable of raising and lowering, a hydraulic cylinder 512 for raising or lowering the lifter 511, and a pair of guide units 513a and 513b for guiding the raising and lowering of the lifter 511.

The lifter 511 may be coupled to the hydraulic cylinder 512 to be raised or lowered together with the hydraulic cylinder 512. The lifter 511 may have a shape used in a forklift. The guide units 513a and 513b are formed to be upright, and may guide the lifter 511 to raise and lower. In addition, lower surfaces of the guide units 513a and 513b may be coupled to the hydraulic cylinder 512 to support the upright state of the hydraulic cylinder 512. The rear surfaces of the guide units 513a and 513b may be coupled to the autonomous vehicle 500.

The hydraulic cylinder 512 may raise or lower the lifter 511 according to hydraulic pressure supplied from a hydraulic pack (not shown in the figure). When hydraulic pressure is supplied to the hydraulic cylinder 512, the hydraulic cylinder 512 rises, and accordingly, the lifter 511 coupled to the hydraulic cylinder 512 also rises. Conversely, when the hydraulic pressure is removed from the hydraulic cylinder 512, the hydraulic cylinder 512 is lowered, and accordingly, the lifter 511 coupled with the hydraulic cylinder 512 is also lowered.

Figure 9:
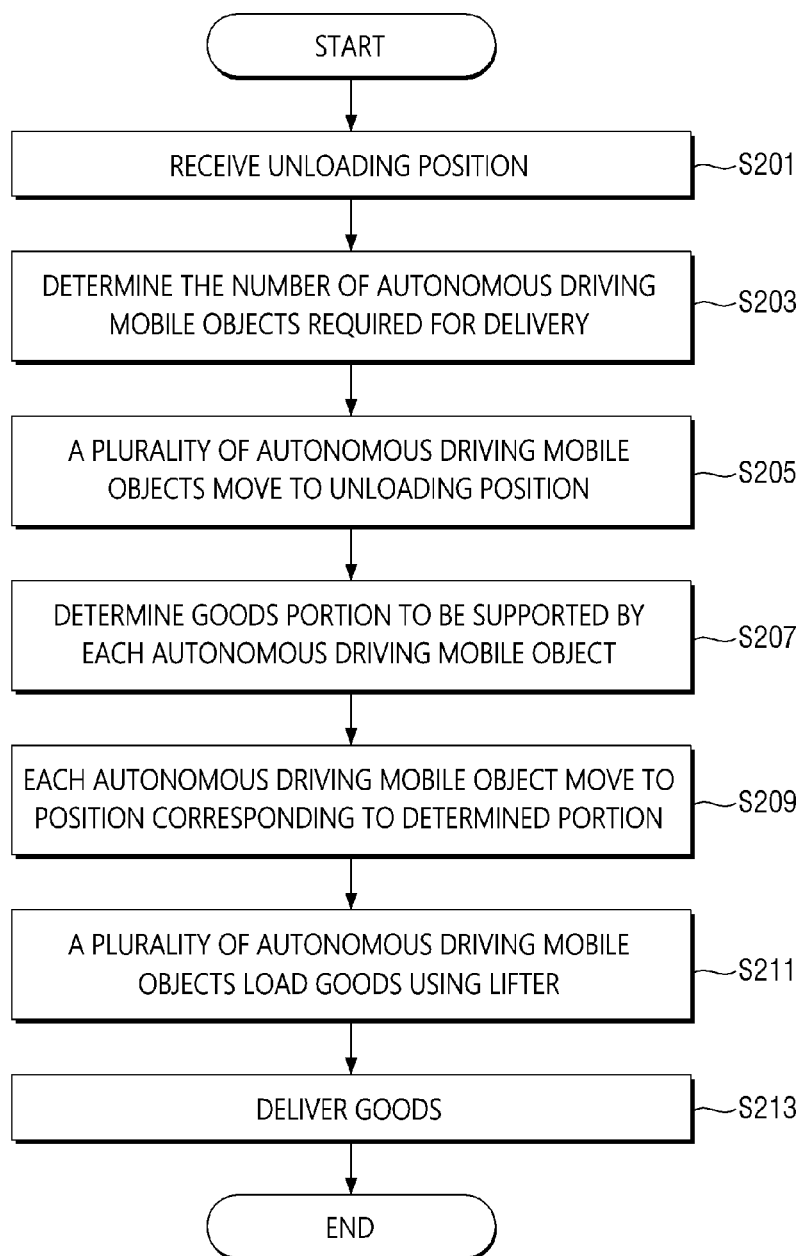
FIG. 9 is a flowchart illustrating a method of delivering goods in collaboration with a plurality of autonomous vehicles according to another embodiment of the present disclosure.

FIG. 9 is a flowchart illustrating a method of delivering goods in collaboration with a plurality of autonomous vehicles according to another embodiment of the present disclosure.

Referring to FIG. 9, one or more autonomous vehicles 500-N may receive position information of an unloading place where the goods 10 is unloaded (S201). In one embodiment, the unmanned aerial vehicle 100 may move to an unloading place, unloads the gripped goods 10 on a landing platform or a ground, and transmit position information (e.g., GNSS coordinates) of the unloaded goods to one or more autonomous vehicles 500-N or the control server 400, and the autonomous vehicle 500-N may receive the position information of the goods, at which the goods 10 is unloaded, from the unmanned aerial vehicle 100 or the control server 400.

Based on at least one of the size, weight, and shape of the goods 10, the number of autonomous vehicles 500-N for loading and delivering the goods 10 may be determined (S203). In an embodiment, the master vehicle among the plurality of autonomous vehicles 500-N may determine the number of the autonomous vehicles 500-N based on at least one of the size, weight, and shape of the goods 10. As another embodiment, the control server 400 may determine the number of autonomous vehicles 500-N based on at least one of the size, weight, and shape of the goods 10.

A plurality of autonomous vehicles 500-N corresponding to the determined number may be selected. Next, the selected plurality of autonomous vehicles 500-N may be moved to an unloading position (S205). Subsequently, a portion of the goods 10 to be supported by each of the selected autonomous vehicles 500-N may be determined (S207).

Next, the plurality of autonomous vehicles 500-N selected for goods delivery may move to positions corresponding to the determined supported portions (S209). That is, each autonomous vehicle 500-N may move to an unloading position and then move to a position corresponding to the determined supported portion. In one embodiment, the master vehicle may move to the unloading position, measure a position (e.g., GNSS coordinates) corresponding to each of the determined portions in advance, and provide position information on the goods portion to be supported by the slave vehicle to the slave vehicle. The slave vehicle may move based on the received position information to a position corresponding to the goods portion to be supported by it. In addition, the master vehicle may move to a position corresponding to the goods portion to be supported by it.

Each autonomous vehicle 500-N may insert the lifter 511 between the ground and the goods 10 in a state where the lifter 511 is not raised, thereby completing the movement to the corresponding portion.

Figure 10:
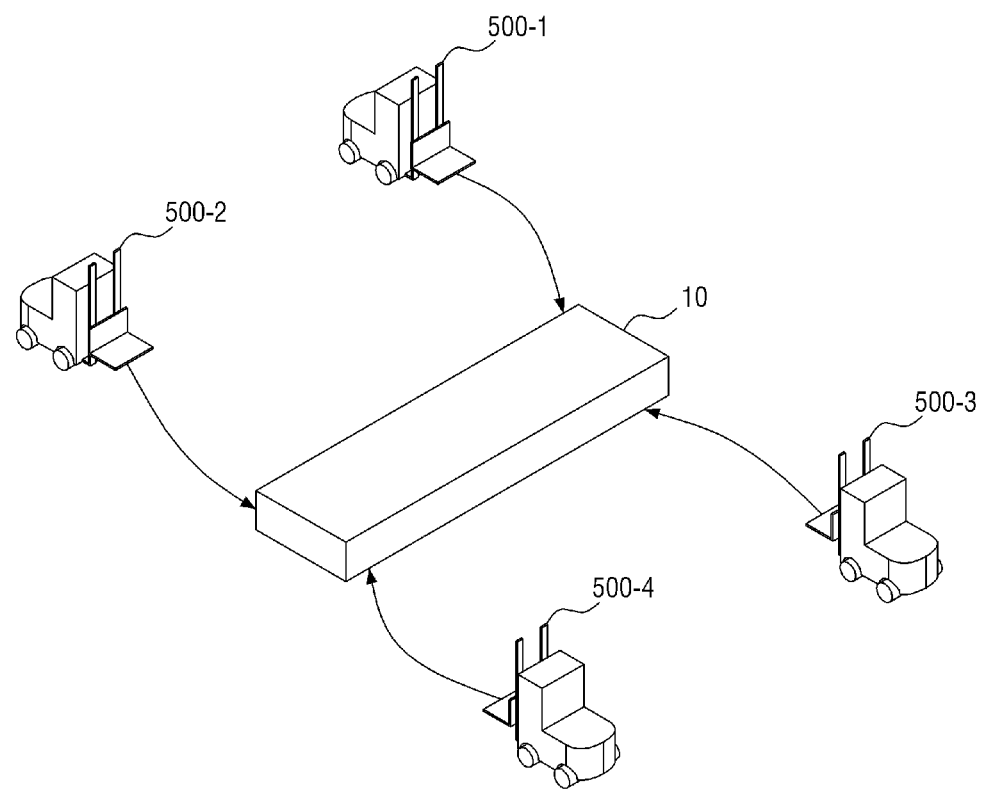
FIG. 10 is a diagram illustrating an approach route of an autonomous vehicle that may be understood with reference to FIG. 9.

FIG. 10 is a diagram illustrating an approach route of an autonomous vehicle that may be understood with reference to FIG. 9.

As illustrated in FIG. 10, each autonomous vehicle 500-N may be moved to support a portion including a corner of the goods 10. At this time, each autonomous vehicle 500-N may complete the movement by inserting the lifter 511 between the ground and the goods 10 without raising the lifter 511.

The autonomous vehicle 500-N that completes the movement to the determined position may transmit a movement completion message to the master mobile objet through short-range communication. When receiving the movement completion message from the slave vehicle, the master vehicle may transmit a loading start message to each slave vehicle.

The slave vehicle and the master vehicle that receive the loading start message simultaneously raise the lifter 511 to a predetermined height to load the goods 10 together (S211).

Figure 11:
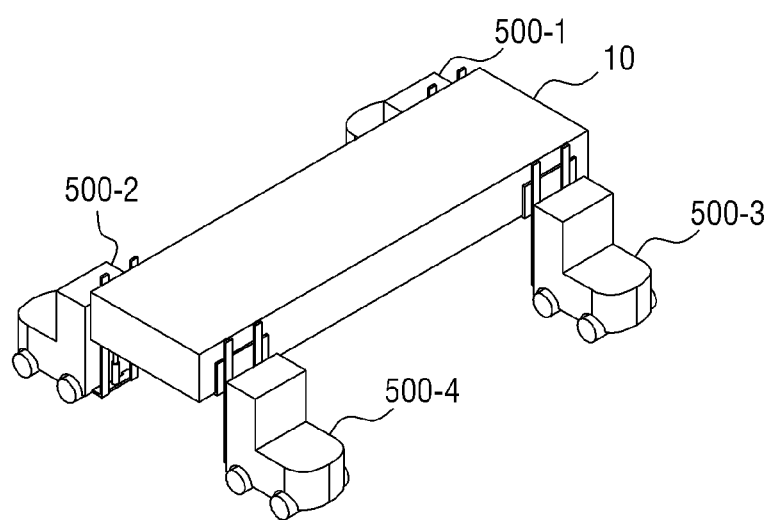
FIG. 11 is a view illustrating a state in which a plurality of autonomous vehicles, which may be understood with reference to FIG. 9, load goods.

FIG. 11 is a view exemplifying a state, in which a plurality of autonomous vehicles are loaded with goods 10, which can be understood with reference to FIG. 9. A plurality of autonomous vehicle may raise the lifter 511 at a predetermined height to load the goods 10 together.

Next, the plurality of autonomous vehicles 500-N that have taken over the goods may check the delivery destination position information in the delivery information, and deliver the goods 10 to the destination (i.e., delivery destination) based on the delivery destination position information (S213). In this case, the plurality of autonomous vehicles 500-N may autonomously drive at a uniform speed and move to a destination.

According to the present embodiment, even when the goods 10 are unloaded on the ground, heavy goods can be safely loaded and delivered using the plurality of autonomous vehicles 500-N.

Figure 12:
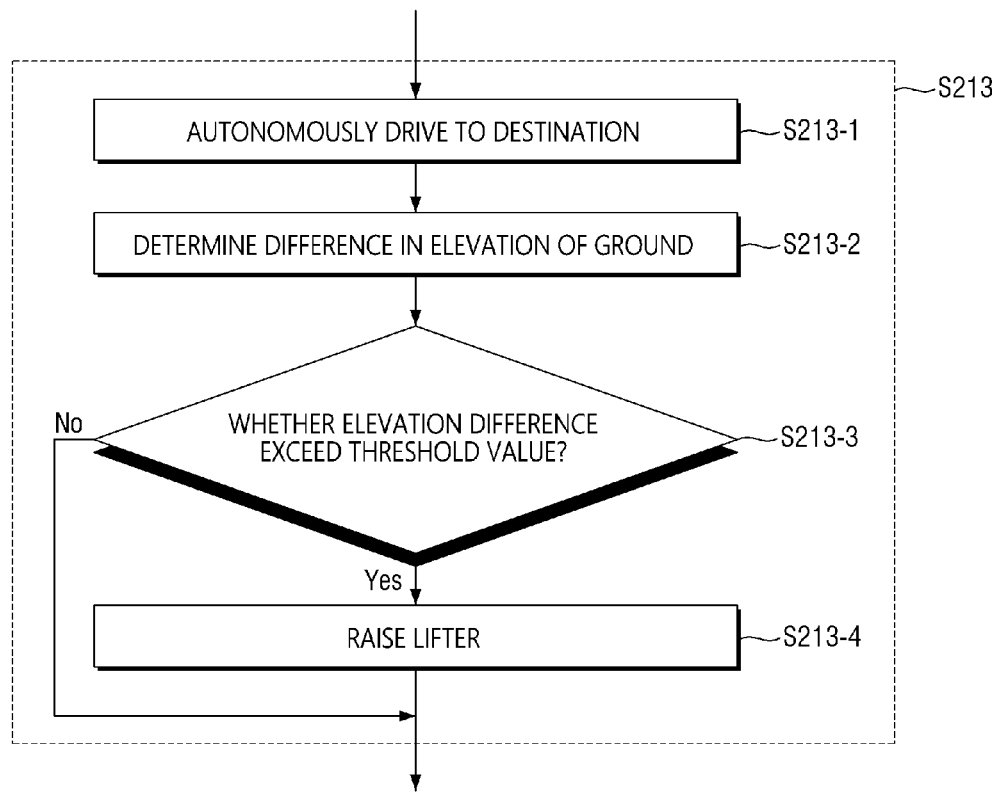
FIG. 12 is a flowchart for describing in more detail some operations of the goods delivery method that may be understood with reference to FIG. 9.

With reference to FIG. 12, a method of delivering goods to a destination (S213) will be described in detail.

A plurality of autonomous vehicles 500-N that took over and loaded the goods 10 may generate a delivery route from the current position to the destination, and autonomously drive to the destination based on the delivery route (S213-1). In this case, the plurality of autonomous vehicles 500-N may autonomously drive uniformly at a preset speed.

Each autonomous vehicle 500-N may determine a difference in elevation of the ground at its current position while it is moving (S213-2). In an embodiment, each autonomous vehicle 500-N may measure the height of the ground at the current position and share the measured height of the ground with each other through short-range communication. The autonomous vehicle 500-N may determine the difference in elevation of the ground by comparing the height of the ground, on which it is located and the height of the ground of the other autonomous vehicle.

Next, it is checked whether the determined elevation difference deviates from the allowable range (S213-3), and when it is deviated, the autonomous vehicle 500-N located on the relatively low ground may raise its lifter 511 so that the equilibrium state of the goods 10 is maintained (S213-4). As another embodiment, when the determined elevation difference deviates from the allowable range, the autonomous vehicle 500-N located on the relatively high ground may lower its lifter 511 so that the equilibrium state of the goods 10 is maintained.

According to this embodiment, by controlling the height of the lifter 511 of the autonomous vehicles when driving on a gradient road, it is possible to prevent a situation, in which goods fall from the autonomous vehicle 500-N on a gradient road.

Figure 13:
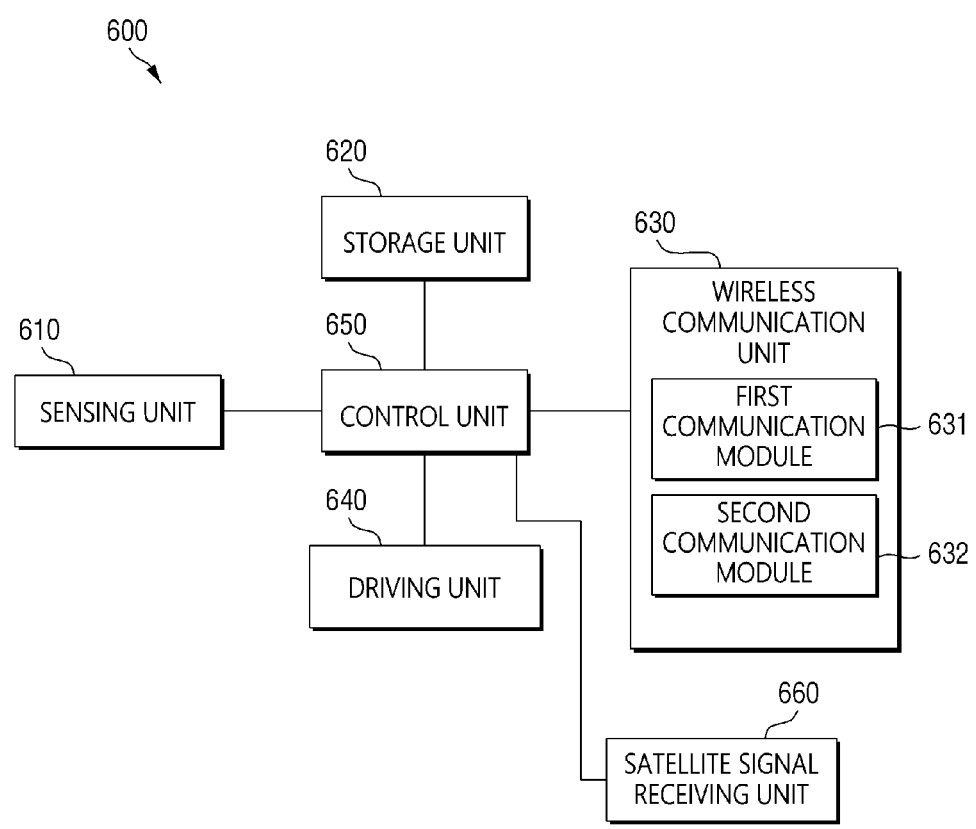
FIG. 13 is a block diagram of an autonomous vehicle according to another embodiment of the present disclosure.

FIG. 13 is a block diagram of an autonomous vehicle according to another embodiment of the present disclosure.

As shown in FIG. 13, the autonomous vehicle 600 may include a sensing unit 610, a storage unit 620, a wireless communication unit 630, a driving unit 640, a satellite signal receiving unit 660 and a control unit 650, and these components may be implemented as hardware or software, or may be implemented through a combination of hardware and software.

The storage unit 620 is a storage means such as a memory and a disk device, and stores various data required for the operation of the autonomous vehicle 600. Also, the storage unit 620 may store 3D map data including topographic gradient data.

The wireless communication unit 630 may perform wireless communication with each of the unmanned aerial vehicle 100 and the control server 400. The wireless communication unit 630 may include a first communication module 631 and a second communication module 632 that perform wireless communication through different protocols.

The first communication module 631 may communicate with the control server 400 and the like using a mobile communication network included in the network 300.

The second communication module 632 may perform wireless communication with each of the unmanned aerial vehicle 100 and other autonomous vehicles using short-range wireless communication. As the short-range wireless communication, protocols such as Wi-Fi, Zigbee, and Bluetooth may be used.

The satellite signal receiving unit 660 may receive a plurality of satellite signals (aka, GPS signals) used for GNSS-based position measurement.

The sensing unit 610 may collect various data necessary for autonomous driving. To this end, the sensing unit 610 may include various sensors such as a camera and a gradient sensor or an image capturing device. The sensing unit 610 may photograph a surrounding image using a camera. Also, the sensing unit 610 may measure the gradient at the current position using the gradient sensor. The gradient sensor may be installed in a goods loading box.

The driving unit 640 includes moving means such as legs and wheels, and moves the autonomous vehicle 600 to a designated position or direction. The driving speed and direction of the driving unit 640 may be controlled according to the control of the control unit 650. The driving unit 640 may be controlled to be in a stopped state without being driven when the autonomous vehicle 600 moves to a target point.

The control unit 650 is a control means such as a microprocessor, and may control various components included in the autonomous vehicle 600. The control unit 650 may receive the delivery information from the control server 400 using the first communication module 631 and store it in the storage unit 620. The control unit 650 may check the unloading position and control the driving unit 640 to move to the unloading position. The control unit 650 may control the driving unit 640 so that the autonomous vehicle 600 can move to a delivery destination. That is, the control unit 650 may control the driving unit 640 so that the autonomous vehicle 600 autonomously drives to the delivery destination after taking over the goods from the unmanned aerial vehicle 100 at the unloading position.

The control unit 650 may recognize the unmanned aerial vehicle 100 for taking over the goods 10 when the movement to the goods handing over point is completed. In one embodiment, the control unit 650 may receive in advance the identification information of the unmanned aerial vehicle 100 for unloading goods from the control server 400 using the first communication module 631 and store it in the storage unit 620. If the identification information received through the second communication module 632 matches the identification information stored in the storage unit 620, it may be determined that the unmanned aerial vehicle 100 for taking over the goods 10 is recognized. As another embodiment, the control unit 650 may photograph the surroundings using a camera included in the sensing unit 610, and analyze the photographed image to recognize the unmanned aerial vehicle 100 existing in the vicinity. In one embodiment, the control unit 650 may form a short-range wireless session with the recognized unmanned aerial vehicle 100 using the second communication module 632, and receive various data required for delivery and unloading of goods from the unmanned aerial vehicle 100. In another embodiment, the control unit 650 may receive the unloading position of the goods 10 that are unloaded on the ground or platform using the wireless communication unit 630.

The control unit 650 may identify a supported portion of the goods 10 to be supported by the autonomous vehicle 600 and control the driving unit 640 to move the autonomous vehicle 600 to a position corresponding to the supported portion. In an embodiment, the autonomous vehicle 600 may receive the supported portion from the master vehicle or the control server 400, or may determine the supported portion by itself based on the size of the goods 10. In addition, the control unit 650 may control the autonomous vehicle 600 to load the goods together with the other autonomous vehicle as the supported portion of the goods 10 is seated in the goods loading unit, and control the driving unit 640 to deliver the loaded goods 10 to the destination by collaboration of the autonomous vehicle 600 and the other autonomous vehicle. The control unit 650 may measure the current position of the autonomous vehicle 600 using the satellite signal receiving unit 660, generate a delivery route from the current position to the destination (i.e., delivery destination), and control the driving unit 640 to move to the destination based on the delivery route.

In one embodiment, the control unit 650 determines the gradient on the delivery route, and when the gradient exceeds a threshold value, the control unit 640 may control the driving unit 640 to reduce the speed of the autonomous vehicle 600, and transmit a message requesting a speed reduction to other autonomous vehicles using the second communication module 632. The control unit 650 may determine the gradient from the current position to a point corresponding to a predetermined distance. The control unit 650 may determine the gradient by using the topographic gradient data included in the 3D map data stored in the storage unit 620, or determine the gradient based on the gradient sensing data acquired through the sensing unit 610.

As shown in FIG. 8, the goods loading unit may be raised or lowered. When the lifter 511 capable of raising and lowering is included in the goods loading unit 510, the control unit 650 may load the supported portion of the goods 10 seated on the ground or platform onto the lifter 511 to raise it to a predetermined height. In this case, the control unit 650 may control the hydraulic pressure supplied to the hydraulic cylinder 512 to raise the lifter 511.

As described above with reference to FIG. 12, the control unit 650 determines a difference in elevation between the ground, on which the other autonomous vehicle is located, and the ground, on which the autonomous vehicle 600 is located, and if the autonomous vehicle 600 is located on a lower ground than the other autonomous vehicle, it may raise the lifter 511 to maintain the equilibrium of the goods 10. Alternatively, the control unit 650 may lower the lifter 511 to maintain the equilibrium of the goods 10 if the autonomous vehicle 600 is located on a higher ground than other autonomous vehicle.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

In the above description, it is described that all the components constituting the embodiments of the present disclosure are combined or operated as one, but the technical features of the present disclosure are not limited to these embodiments. That is, within the scope of the present disclosure, all of the components may be selectively combined and operated in one or more combinations.

Although the operations are shown in a specific order in the drawings, those skilled in the art will appreciate that many variations and modifications can be made to the embodiments without substantially departing from the principles of the present disclosure. Therefore, the disclosed preferred embodiments of the disclosure are used in a generic and descriptive sense only and not for purposes of limitation. The scope of protection of the present disclosure should be interpreted by the following claims, and all technical ideas within the scope equivalent thereto should be construed as being included in the scope of the technical idea defined by the present disclosure.

What is claimed is:

1. A method for handling goods in collaboration of an autonomous vehicle and an unmanned aerial vehicle, the method comprising:
   identifying, by the autonomous vehicle, a location that provides a flat area greater than or equal to a floor area required for unloading the goods, based on the size of the goods to be taken over from the unmanned aerial vehicle;
   determining, by the autonomous vehicle, the identified location as a goods handing over point;
   providing, by the autonomous vehicle, information of the goods handing over point to the unmanned aerial vehicle; and
   receiving, by the autonomous vehicle, the goods from the unmanned aerial vehicle at the goods handing over point,
   wherein, the goods handing over point is determined using a peripheral gradient measured by the autonomous vehicle, and the size of the flat area is determined based on the size of the goods and the number of other autonomous vehicles.

2. The method of claim 1, further comprising:
   providing, by the autonomous vehicle, the information about the goods handing over point to one or more other autonomous vehicles so that the one or more other autonomous vehicles are gathered to the goods handing over point; and
   wherein receiving, by the autonomous vehicle, the goods from the unmanned aerial vehicle at the goods handing over point comprises:
   receiving, by the autonomous vehicle, the goods from the unmanned aerial vehicle by collaborating with the one or more other autonomous vehicles that have moved to the goods handing over point.

3. The method of claim 2, further comprising:
   determining, by the autonomous vehicle, a portion of the goods to be supported by the autonomous vehicle and the one or more other autonomous vehicles, based on the number of other autonomous vehicles and the size of the goods; and
   providing position information on the determined portion of the goods to each other autonomous vehicle.

4. The method of claim 3, wherein receiving, by the autonomous vehicle, the goods from the unmanned aerial vehicle at the goods handing over point comprises:
   receiving, by the autonomous vehicle, the goods from the unmanned aerial vehicle by collaborating with the one or more other autonomous vehicles located at the position corresponding to the determined portion of the goods.

5. The method of claim 3, wherein receiving, by the autonomous vehicle, the goods from the unmanned aerial vehicle at the goods handing over point comprises:
   transmitting, by the autonomous vehicle, an unloading request signal to the unmanned aerial vehicle in response to the one or more autonomous vehicles being positioned at the determined portion of the goods.

6. An autonomous vehicle comprises:
   a driving unit for moving the autonomous vehicle;
   a goods loading unit, in which goods took over from an unmanned aerial vehicle are seated; and
   a control unit,
   wherein the control unit:
   identifies a location that provides a flat area greater than or equal to a floor area required for unloading the goods, based on the size of the goods to be taken over from the unmanned aerial vehicle;
   determines the identified location as a goods handing over point;
   controls to provide information of the goods handing over point to the unmanned aerial vehicle; and
   receives the goods from the unmanned aerial vehicle at the goods handing over point,
   wherein, the goods handing over point is determined using a peripheral gradient measured by the autonomous vehicle, and the size of the flat area is determined based on the size of the goods and the number of other autonomous vehicles.

7. The autonomous vehicle of claim 6, wherein the goods loading unit includes a lifter capable of raising and lowering,
   wherein the control unit:
   determines a portion of the goods to be supported by the autonomous vehicle and one or more other autonomous vehicles, based on the number of other autonomous vehicles and the size of the goods; and
   loads the supported portion of the goods in the lifter and raises it to a predetermined height.

8. The autonomous vehicle of claim 7,
   wherein the control unit:
   determines a difference elevation between a ground, on which the other autonomous vehicle is located, and a ground, on which the autonomous vehicle is located; and
   raises the lifter if the autonomous vehicle is located on a lower ground than the other autonomous vehicle, or lowers the lifter if the autonomous vehicle is located on a higher ground than the other autonomous vehicle.

9. The autonomous vehicle of claim 6, wherein the control unit determines a gradient on a delivery route, and transmits a message requesting a speed reduction to the other autonomous vehicle when the gradient exceeds a threshold value.

* * * * *